Sept. 29, 1964
J. J. MOON ETAL
3,151,047
SEPARATION OF ORGANIC COMPOUNDS BY FRACTIONAL
DISTILLATION AND PHASE SEPARATION
Filed Sept. 12, 1960
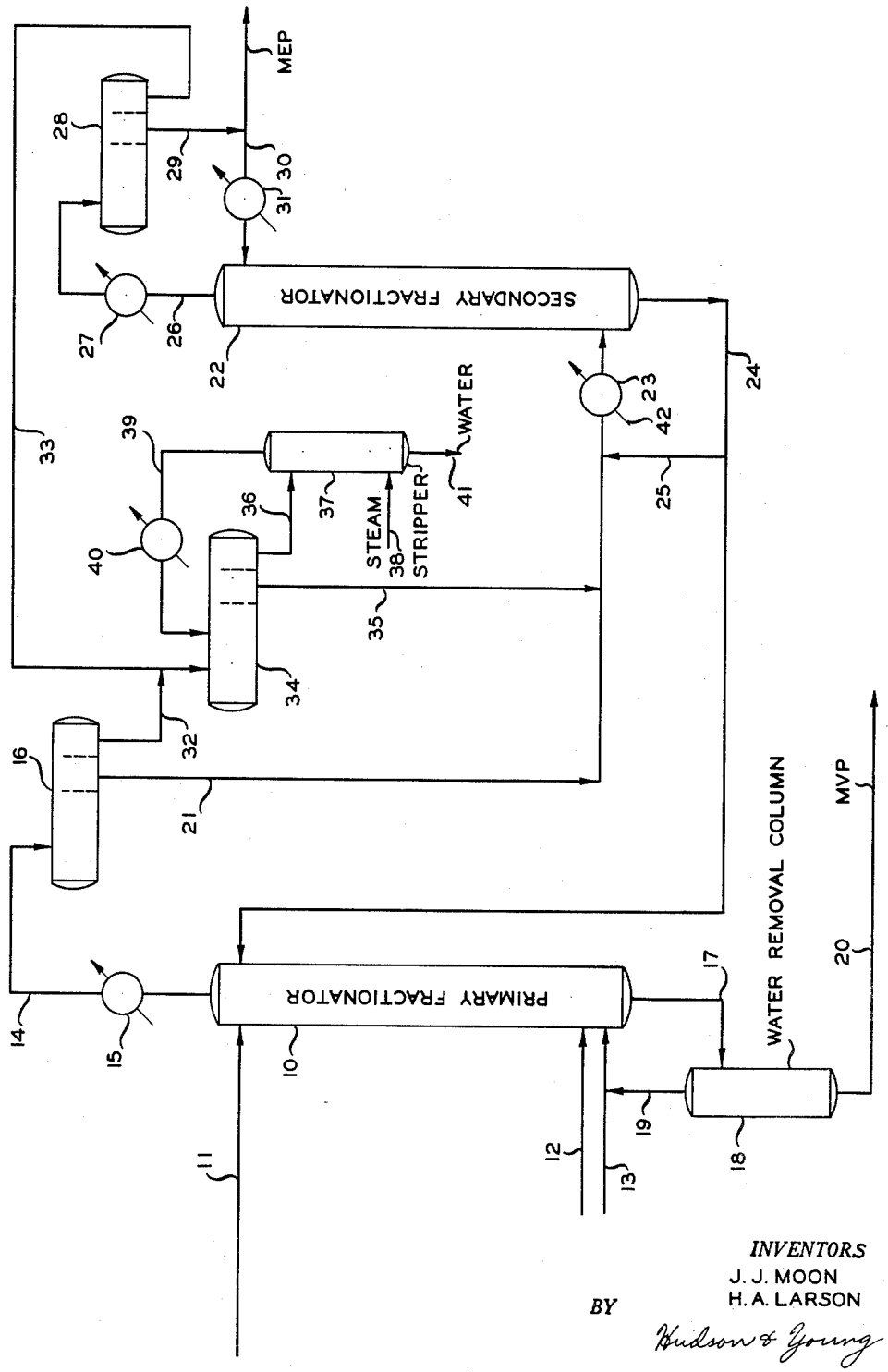
INVENTORS
J. J. MOON
H. A. LARSON
BY
*Hudson & Young*
ATTORNEYS 3,151,047
SEPARATION OF ORGANIC COMPOUNDS BY FRACTIONAL DISTILLATION AND PHASE SEPARATION
John J. Moon and Harold A. Larson, Bartlesville, Okla., assignors to Phillips Petroleum Company, a corporation of Delaware
Filed Sept. 12, 1960, Ser. No. 55,349
4 Claims. (Cl. 202—46)

This invention relates to an improved process for the fractional separation of a mixture of organic compounds. In one specific aspect this invention relates to an improved process for the fractional separation of a mixture of organic compounds, at least one of said organic compounds being thermally polymerizable. In another specific aspect this invention relates to the fractional separation of a mixture comprising one or more vinyl substituted heterocyclic nitrogen containing compounds. In another specific aspect this invention relates to the separation of methylethylpyridine from methylvinylpyridine by fractional distillation.

In a conventional process for the production of a polymerizable organic compound such as 2-methyl-5-vinylpyridine (MVP), the first step consists of polymerizing acetaldehyde to paraldehyde in the presence of a sulfuric acid catalyst. Paraldehyde is then reacted with ammonia in the presence of a catalyst such as ammonium acetate to form 2-methyl-5-ethylpyridine (MEP). MVP is then produced by the catalytic dehydrogenation of MEP, employing as a catalyst, for example, chromium oxide supported on an inert material.

The effluent from the dehydrogenation reactor containing MVP, MEP and lighter pyridine compounds is fractionated to recover the MVP product. Because of the tendency of these vinyl compounds to polymerize on standing, or at elevated temperatures, fractionation of the dehydrogenated reactor effluent is difficult to accomplish. The presence of polymer in the product is particularly undesirable because vinylpyridine compounds are used as monomers for use in polymerization reactions and the like. To check polymerization during the fractional distillation step, it is necessary to keep the amount of liquid in the fractionator to a minimum.

Accordingly, an object of this invention is to provide an improved process for the fractional separation of a mixture of organic compounds. Another object of this invention is to provide an improved process for the fractional separation of a mixture of organic compounds, at least one of said organic compounds being thermally polymerizable.

Another object of this invention is to provide an improved process for the fractional separation of a mixture comprising one or more vinyl substituted heterocyclic nitrogen containing compounds.

Another object of this invention is to provide an improved process for the fractional separation of methylethylpyridine from methylvinylpyridine.

Other objects, advantages, and features of our invention will be readily apparent to those skilled in the art from the following description and the appended claims.

The drawing is a schematic diagram of a preferred embodiment of the inventive process.

Referring to the drawing, there is shown a conventional fractionating column 10 capable of providing countercurrent contact of liquid and vapors with reflux. Fractionating column feed material comprising a mixture of organic compounds is introduced into the upper region of column 10 by means of conduit 11. The feed material is countercurrently contacted in column 10 with live superheated or saturated steam passed to column 10 by means of conduit 12. To eliminate local polymerization in those cases where the feed material comprises, in part, at least one thermally polymerizable compound, large volumes of steam are employed to thus obtain the desired fractionating temperature level without causing local "hot spots" resulting in the aforementioned local polymerization. Thus the use of steam permits a lower fractionating temperature. Additional water and steam, from a source hereinafter described, can also be passed to column 10 by means of conduit 13.

Overhead vapors flow through conduit 14, are condensed by a conventional heat exchange means 15, and separated into an aqueous and an organic phase in phase separator 16. A kettle product is withdrawn from column 10 via conduit 17 and passed to a water removal column 18 wherein the organic phase is separated from the aqueous phase. A preferred method of removing the water phase from water column 18, but not necessarily limited thereto, is to operate column 18 under a vacuum by passing a vacuum jet steam stream through conduit 13, removing water overhead via conduit 19 from column 18 and passing the combined stream to column 10. In this manner, the organic phase not separated in column 18 is returned to the fractionating column 10. An organic phase product stream is removed from water column 18 via conduit 20.

The organic phase is removed from phase separator 16 and passed via conduit 21 to a secondary fractionating column 22. Column 22 is provided with an exterior reboiler 23 employing low pressure steam, or other suitable heat exchange means, capable of raising indirectly the temperature of the feed material to the desired fractionating level, vaporizing the water contained in the feed material, and at the same time, not cause local thermal polymerization. Although an external reboiler is shown, the inventive process is not limited thereto. An internal reboiler can be utilized. A kettle product is withdrawn from column 22 and passed as reflux to column 10 via conduit 24. A portion of the kettle product stream is recycled to column 22 via conduits 24, 25 and 21. Overhead vapors flow through conduit 26, are condensed by conventional heat exchange means 27, and separated into an aqueous and an organic phase in phase separator 28.

An overhead product organic phase stream is removed from phase separator 28 by means of conduit 29. A portion of the overhead organic phase product stream is passed as reflux to column 22 by means of conduit 29, conduit 30 and heat exchange means 31 wherein the temperature of the reflux stream is raised to the desired operating level.

The water phases from phase separators 16 and 28 are passed via conduits 32 and 33 respectively to a phase separator 34. A separated organic phase is removed from phase separator 34 and passed as feed material to column 22 via conduit 35 and 21. A water phase is removed from phase separator 34 and passed via conduit 36 to a stripper column 37.

The water phase removed from phase separator 34 is countercurrently contacted with a stripping steam stream passed to stripper 37 via conduit 38. An overhead stream is removed from stripper 37 by means of conduit 39, cooled by a heat exchange means 40 and recycled to phase separator 34. Water is withdrawn from stripper 37 via conduit 41.

To illustrate the inventive process reference is made to a specific fractional distillation of an MVP–MEP mixture charged to column 10 via conduit 11 at the rate of 6.6 g.p.m. The charge mixture contains 3.81 g.p.m. of MEP, 1.62 g.p.m. of MVP, .32 g.p.m. of light pyridines and 0.86 g.p.m. of water. The feed and product stream rates have been corrected for material balance purposes to a base temperature of 120° F. Primary fractionator 10 is 9 feet in diameter and contains 113 trays. The top of the column is provided with 15 Dualflow trays, the middle of the column contains 81 Koch trays and the lower part of the column is provided with 17 Dualflow trays. Primary fractionator 10 is operated at a top pressure of 130 mm. Hg, a kettle temperature of 190° F. and a kettle pressure of 280 mm. Hg. Superheated steam at a temperature of 575° F. and at a rate of 14,500 lbs./hr. is introduced to primary fractionator 10 via conduit 12. Additional water and steam, from a source hereinafter described, at a rate of 1500 lbs./hr. and 300 p.s.i.g. are introduced to primary fractionator 10 via conduit 13.

An overhead vaporous product stream is removed from primary fractionator 10 via conduit 14, is condensed and passed to phase separator 16. The overhead stream removed from primary fractionator 10 contains approximately 90 mol percent water. The temperature of phase separator 16 is maintained at approximately 105° F. A phase separation is made in phase separator 16 between the organic and water phases.

A kettle product stream is withdrawn from primary fractionator 10 via conduit 17 and passed to a water removal column 18 in which water is separated from the product stream and removed as an overhead product from water column 18 via conduit 19. Water removal column 18 is operated at a top temperature of 94° F. and a kettle temperature of 160° F., said temperature maintained by a method not herein illustrated, such as recycling a portion of the kettle product from said water removal column 18 through a reboiler and back to water removal column 18. A vacuum is maintained within water removal column 18 by passing a vacuum jet steam through conduit 13 at a pressure of 300 p.s.i. and at the rate of 1500 lbs./hr. In this manner, water removal column 18 is operated at a top pressure of 10 mm. Hg and a bottom pressure of 25 mm. Hg. A water-free kettle product stream is removed from water column 18 via conduit 20 at the rate of 1.6 gallons per minute. The kettle product stream contains 1.51 g.p.m. of MVP and 0.09 g.p.m. of MEP corrected to a temperature of 120° F.

An organic phase at a rate of 38.1 g.p.m. and containing approximately 50 mol percent water is removed from phase separator 16 via conduit 21 and passed to reboiler 23, preferably a thermosyphon reboiler, of a secondary fractionator 22. The organic phase stream entering reboiler 23 is combined with an organic product stream removed from phase separator 34 and a kettle product stream removed from secondary fractionator 22 and recycled via conduits 24, 25 and 21 at the rate of 750 g.p.m. Low pressure steam, used to eliminate the possibility of local polymerization being caused by high temperature superheated steam, is passed to reboiler 23 via conduit 42 at a pressure of 30 p.s.i.g. and at a rate of 6350 lbs./hr.

A vaporous stream at the rate of 790 g.p.m. is passed from reboiler 23 to a secondary fractionator 22. Secondary fractionator 22 is 5 feet in diameter, containing 40 Dualflow trays and is operaed at a top temperature of 173° F. and a top pressure of 102 mm. Hg. Kettle temperature and pressure in the secondary fractionator 22 are 215° F. and 150 mm. Hg respectively.

A vaporous overhead product stream is removed from secondary fractionator 22 via conduit 26, condensed by a heat exchange means 27 and passed to a phase separator 28. An organic phase product stream at the rate of 4.9 g.p.m. is removed from phase separator 28 via conduit 29 and is passed to storage. The product stream passed to storage contains 3.72 g.p.m. of MEP, 0.14 g.p.m. of MVP and 0.32 g.p.m. of light pyridines A portion of the organic phase removed from phase separator 28 is heated by means of a heat exchange means 31 and passed via conduit 30 at the rate of 14.1 g.p.m. to secondary fractionator 22 as reflux.

Kettle product is removed from secondary fractionator 22 via conduit 24. A portion of said kettle product at the rate of 30 g.p.m. is passed to the top of primary fractionator 10 as reflux. The remainder of said kettle product at a rate of 750 g.p.m. is recycled via reboiler 23 to secondary fractionator 22 in the manner heretofore described.

The water phases from phase separators 16 at the rate of 27.5 g.p.m. and 28 at the rate of 4.7 g.p.m. are passed via conduits 32 and 33 respectively to a third phase separator 34. The water phase from phase separator 34 is passed via conduit 36 at the rate of 47.8 g.p.m. to stripper 37. An organic phase from phase separator 34 is passed via conduit 35, conduit 21 and reboiler 23 to the secondary fractionator 22 at the rate of 1.9 g.p.m., thus permitting additional MVP-MEP product to be removed from the water phase.

Stripper 37 is operated at a top temperature and pressure of 254° F. and 36 p.s.i.a. respectively, and a bottom temperature of 262° F. Steam at 30 p.s.i.g. and at a rate of 4,900 lbs./hr. is introduced into stripper 37 via conduit 38. An overhead stream containing organic compounds stripped from the water phase in stripper 37 is passed via conduit 39 and condenser 40 to phase separator 34 at the rate of 8.7 g.p.m. Water at the rate of 48.6 g.p.m. is removed from stripper 37 via conduit 41.

The inventive process has produced in the absence of polymerization an MVP product of 95 percent purity and an MEP product of 96.6 percent purity when based upon an MEP-MVP feed mixture containing no light pyridines. Although the inventive process has been preferentially described so as to include the additional steps necessary to remove organic product in the water phases removed from phase separators 16 and 28, it is within the scope of this invention to eliminate these steps.

The inventive process has been described in terms of specific operating conditions. It is, of course, understood to be within the skill of the art to vary these operating variables in accordance with the organic compounds to be separated and the capacities of the operating equipment.

As will be evident to those skilled in the art, other modifications of this inventive process can be made, or followed, in the light of the foregoing disclosure and discussion without departing from the spirit or scope thereof.

We claim:

1. Process for the fractional distillation of organic compounds which comprises introducing a liquid feed mixture of organic compounds into the upper region of a first distillation zone, injecting steam into the lower region of said first distillation zone, withdrawing an overhead vaporous fraction from said first distillation zone, condensing and passing said overhead fraction to a first phase separation zone, permitting said condensed overhead organic fraction to settle into an organic phase and a water phase in said first phase separation zone, passing said organic phase into the lower region of a second distillation zone, withdrawing an organic residual fraction from said first distillation zone, passing said organic residual fraction to a water removal zone, separating water from said organic residual fraction by distillation and recycling said water to the lower region of said first distillation zone, withdrawing a substantially water-free organic fraction from asid water removal zone, withdrawing an organic bottoms fraction from said second distillation zone, recycling a portion of said organic bottoms fraction to said second distillation zone, recycling the remainder of said organic bottoms fraction to said first distillation zone as reflux, withdrawing an overhead vaporous fraction from said second distillation zone, condensing and passing said second distillation zone overhead fraction to a second phase separation zone, permitting said overhead fraction to settle into a water phase and an organic phase in said second phase separation zone, withdrawing said organic phase from said second phase separation zone, recycling at least a portion of said overhead organic phase from said second phase separation zone to said second distillation zone as reflux, withdrawing said water phases from said first and second phase separation zones, passing said withdrawn water phases to a third phase separation zone, withdrawing a water phase from said third phase separation zone and passing an organic phase from said third phase seperation zone to said second distillation zone.

2. The process of claim 1 to include passing said third phase separation zone withdrawn water phase to a stripping zone, withdrawing water from said stripping zone and passing an organic phase containing stream from said stripping zone to said third phase separation zone.

3. The process of claim 2 wherein said organic compound feed mixture is comprised, in part, of at least one thermally polymerizable organic compound.

4. The process of claim 2 wherein said organic feed substantially comprises a mixture of methylethylpyridine and methylvinylpyridine, and said separated organic phase withdrawn from said first phase separation zone comprises methylethylpyridine, methylvinylpyridine and water.

References Cited in the file of this patent
UNITED STATES PATENTS

| | | |
|---|---|---|
| 2,081,189 | Wiezevich | May 25, 1937 |
| 2,324,955 | Rupp et al. | July 20, 1943 |
| 2,350,609 | Hachmuth | June 6, 1944 |
| 2,408,933 | Iverson | Oct. 8, 1946 |
| 2,437,649 | Milner | Mar. 9, 1948 |
| 2,476,206 | McCants | July 12, 1949 |
| 2,657,243 | Giraitis et al. | Oct. 27, 1953 |
| 2,716,631 | Bechtel | Aug. 30, 1955 |
| 2,849,358 | Bergman et al. | Aug. 26, 1958 |
| 2,955,500 | Dilbert | Aug. 8, 1961 |